DAVID WIGGINS, OF GREENPORT, NEW YORK.

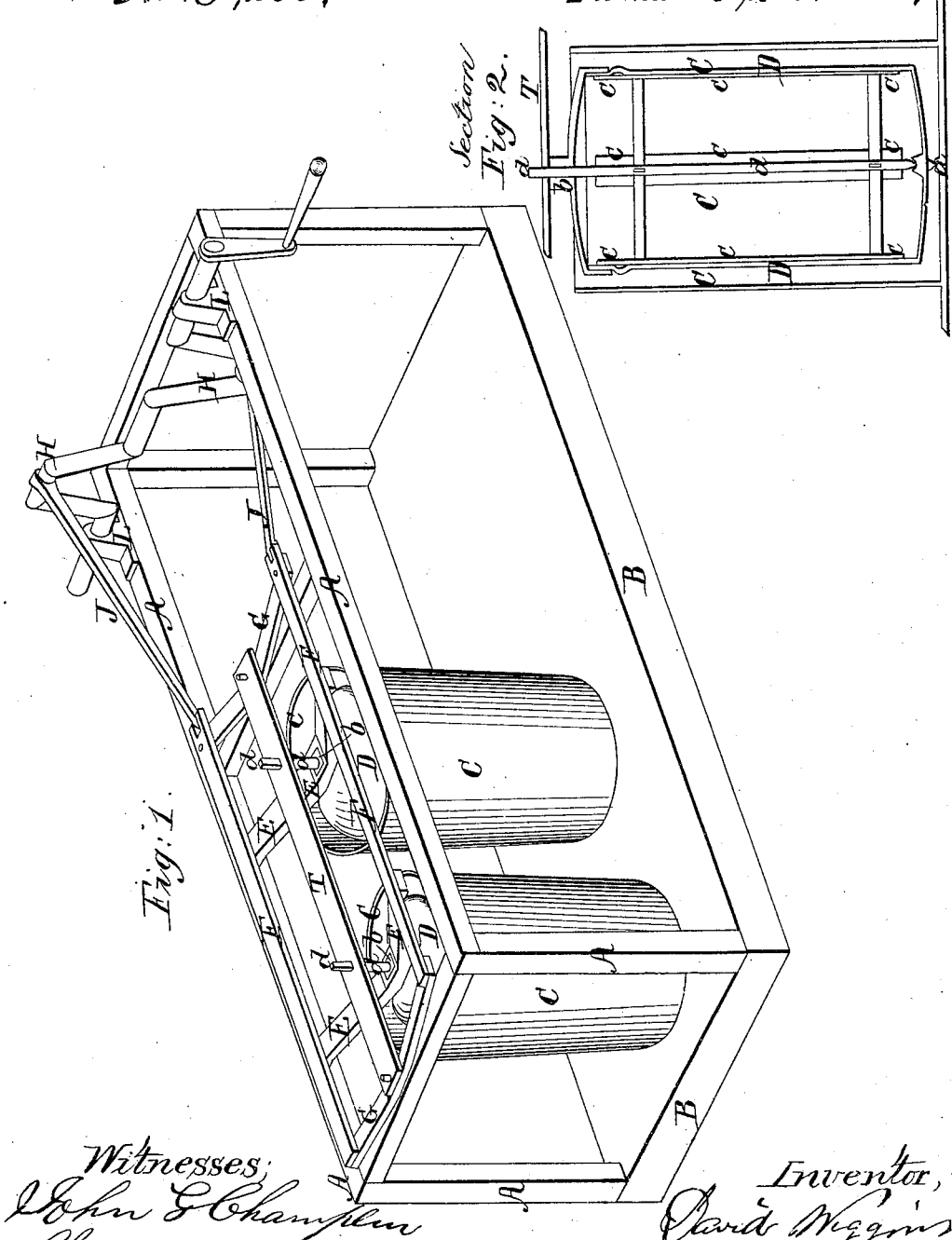

Letters Patent No. 89,259, dated April 20, 1869.

IMPROVED ICE-CREAM FREEZER.

The Schedule referred to in these Letters Patent and making part of the same.

*To whom it may concern:*

Be it known that I, DAVID WIGGINS, of the village of Greenport, in the county of Suffolk, and State of New York, have invented a new and useful Improvement in Machinery for Freezing Cream; and I do hereby declare that the following is a full, clear, and exact description of the same, reference being had to the accompanying drawing, and to the letters of reference marked thereon, of which—

Figure 1 shows the machinery for operating two freezers in perspective.

Figure 2 is a section through one of the ice-cream freezers, detached from the machinery for operating it.

The nature of my invention consists in arranging two or more freezers in a line with each other at suitable distances apart, and communicating to the cylinder containing the cream an oscillating motion, by means of jointed arms, paralleled bars, connecting-rods, and double cranks; and also in arranging a series of scrapers within the ice-cream cylinder, so that it will remain stationary while the cylinder oscillates around them, described as follows:

A represents a strong frame, and

B, the bed of the frame, upon which are fixed the cylindrical ice-holders C, two being shown in this case.

Within this are placed the cream-cylinders D, which rest upon a pivot, a, so that they will turn with more ease.

Ice is then placed around the cylinder in the usual manner, and the cover put on the cream-cylinder.

The cover has a square portion, which fits into a cavity in the centre of arms E E.

These arms are pivoted to two paralleled bars F F, which are jointed in their movements by two arms, G G, these being pivoted centrally to the cross-braces of the frame A.

The paralleled bars F F receive an alternate reciprocating-motion from the double-cranks H H, being connected to these cranks by pitman-rods J J.

The crank-shaft is supported in journal-boxes L L, mounted upon the top of the frame, so as to be in a horizontal plane with the bars F F, and may have a fly-wheel on one end in order to equalize the motion of the parts to be driven by hand or steam-power, whichever is found most convenient.

It is necessary in my mode of freezing cream, as it is in every instance, to frequently stir or scrape the freezing-mixture from the sides of the freezer.

This I accomplish with very little difficulty by arranging a stationary scraper, which is made up of vertical strips, C, of thin metal, and these are fitted to the inside of the freezer.

These strips of metal, C, are fixed to radial arms projecting from the vertical fixed rod, which rests upon the bottom of the cylinder D, and passes up centrally through the freezer-cap, and is fixed to a horizontal bar, T, which is fixed, at either end, to the bolts, which hold the arms G to the cross-bars, so that the bar T may be readily removed when found necessary.

This arrangement effects the constant scraping away of the frozen mixture from the sides of the cylinder, and by this means the cream will be frozen more solid and the ingredients more intimately mixed during the operation of congelation.

This manner of freezing cream is designed more particularly for large establishments, where great quantities of ice-cream are made, so that several large vessels of the article can be frozen at one time, with an economical expenditure of power.

What I claim as my invention, and desire to secure by Letters Patent, is—

The arms E, parallel bars F, pitmen J, fixed bar T, and stationary scraper C, combined and operating substantially as described.

To the above, I have signed my name, this 17th day of March, 1869.

DAVID WIGGINS.

Witnesses:
 LUTHER MOORE,
 CHRISTOPHER B. MOORE.